April 14, 1925.　　　　　　　　　　　　　　　　　　1,533,683
C. G. ABBOT
COMPASS AND MAGNETIC DIP INDICATOR
Filed Oct. 27, 1921　　　3 Sheets-Sheet 1
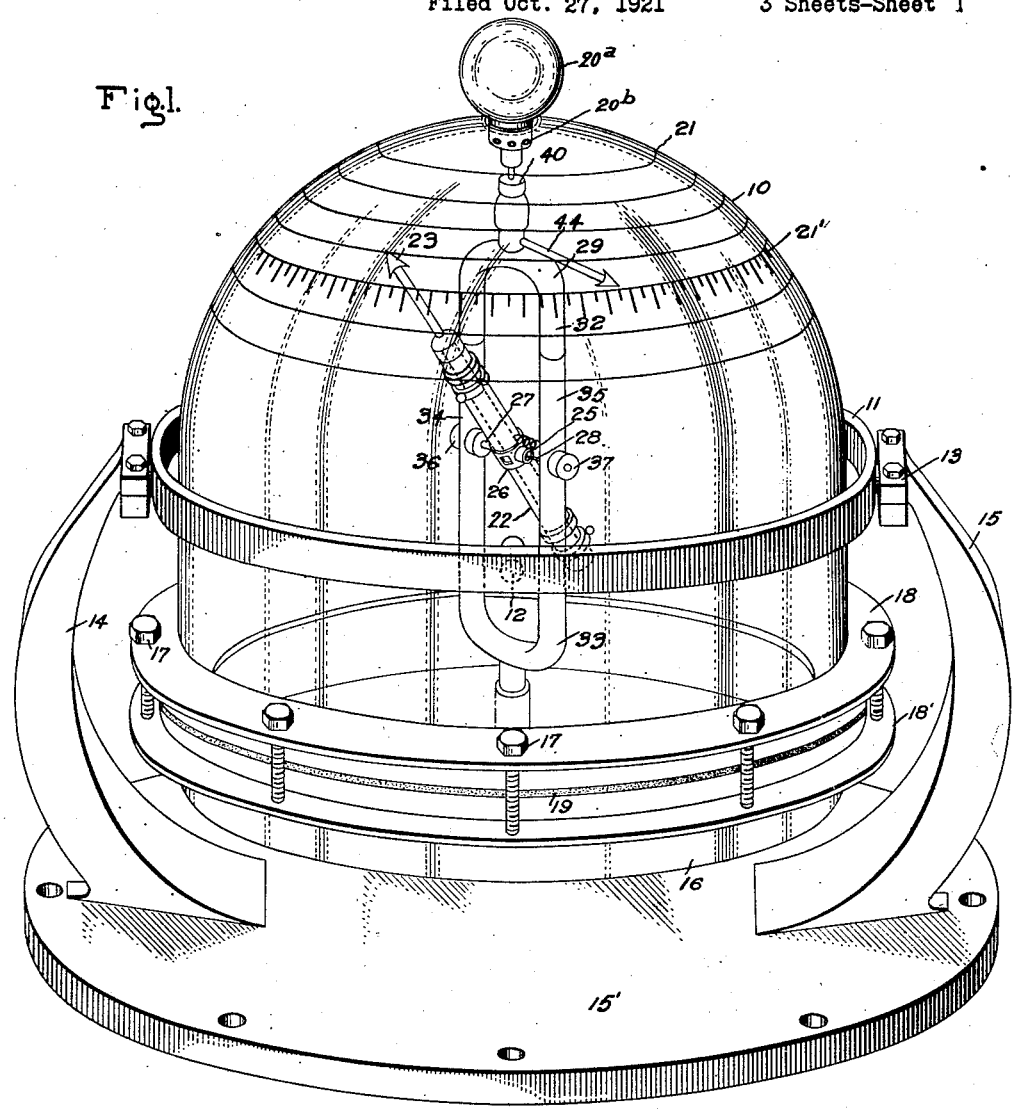
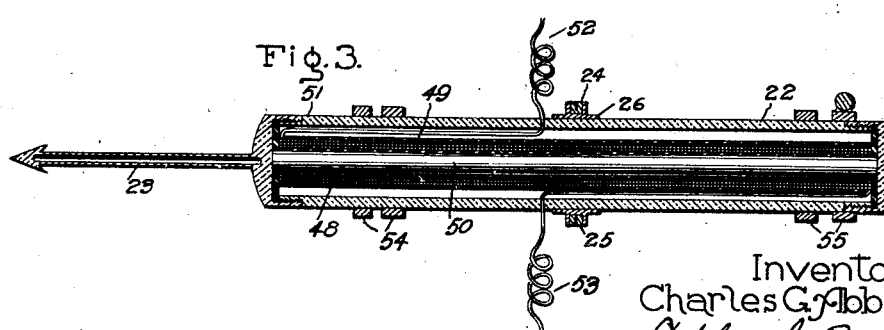
Inventor:
Charles G. Abbot,
by His Attorney.

April 14, 1925.  1,533,683

C. G. ABBOT

COMPASS AND MAGNETIC DIP INDICATOR

Filed Oct. 27, 1921  3 Sheets-Sheet 2

Inventor:
Charles G. Abbot,
by
His Attorney.

April 14, 1925.  1,533,683
C. G. ABBOT
COMPASS AND MAGNETIC DIP INDICATOR
Filed Oct. 27, 1921   3 Sheets-Sheet 3

Inventor
Charles G. Abbot,
by
His Attorney

Patented Apr. 14, 1925.

1,533,683

UNITED STATES PATENT OFFICE.

CHARLES G. ABBOT, OF WASHINGTON, DISTRICT OF COLUMBIA, ASSIGNOR TO GENERAL ELECTRIC COMPANY, A CORPORATION OF NEW YORK.

COMPASS AND MAGNETIC DIP INDICATOR.

Application filed October 27, 1921. Serial No. 510,802.

*To all whom it may concern:*

Be it known that I, CHARLES G. ABBOT, a citizen of the United States, residing at Washington, in the District of Columbia, have invented certain new and useful Improvements in Compass and Magnetic Dip Indicators, of which the following is a specification.

My invention relates to a compass and magnetic dip indicator and has for its object the provision of means for supporting a magnetic needle so that it is free to take up a position in the direction of the earth's magnetic field.

More specifically my invention relates to means for mounting a compass needle in such manner that it gives indications both of the points of the compass and of the dip or inclination of the earth's magnetic field.

In carrying out my invention, I employ a closed vessel made of a suitable transparent material, such as glass, which is filled with a liquid. This vessel is supported in gimbals in such manner that it is maintained in a horizontal position. Inside the vessel is immersed an electromagnetic compass needle. The compass needle is constructed to have a mean density equal to that of the liquid, it is supported entirely by the buoyant effect of the liquid, and is in equilibrium in any position in the liquid. The compass needle is thus freely movable in the liquid, and its movements are defined by means of suitable jeweled bearings or by means of threads to take place about intersecting horizontal and vertical axes. Two suitable scales are arranged on the transparent containing vessel upon one of which the compass needle indicates the magnetic dip when it takes up a position in the direction of the earth's magnetic field, at the same time indicating the points of the compass on the second scale.

My invention is particularly adapted for use on supports which are continually in motion, such as ships and airplanes, and by means of my invention I am enabled to automatically determine dip and compass bearing, regardless of the angular position of the support for the instrument and to a high degree independently of the accelerations of motion which the support undergoes.

Figure 2:
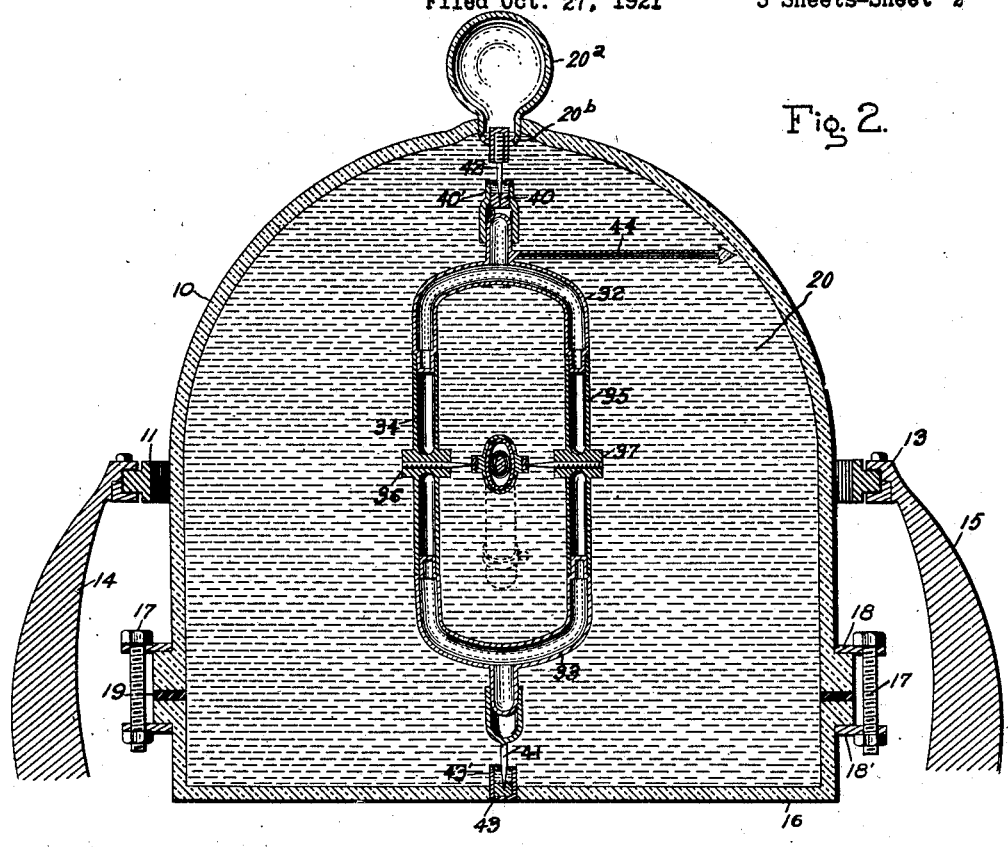
Figure 4:
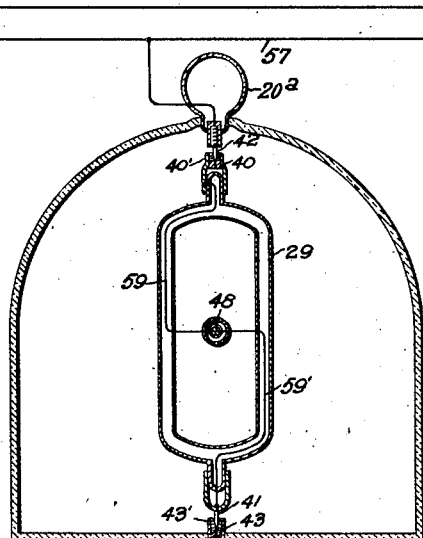
Figure 5:
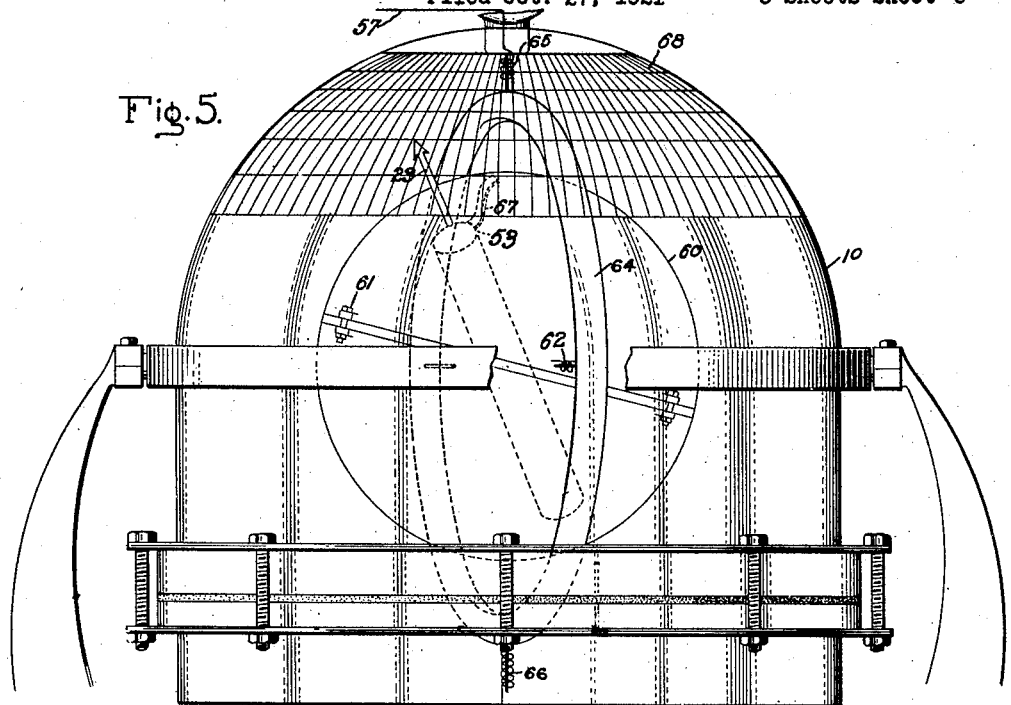
Figure 6:
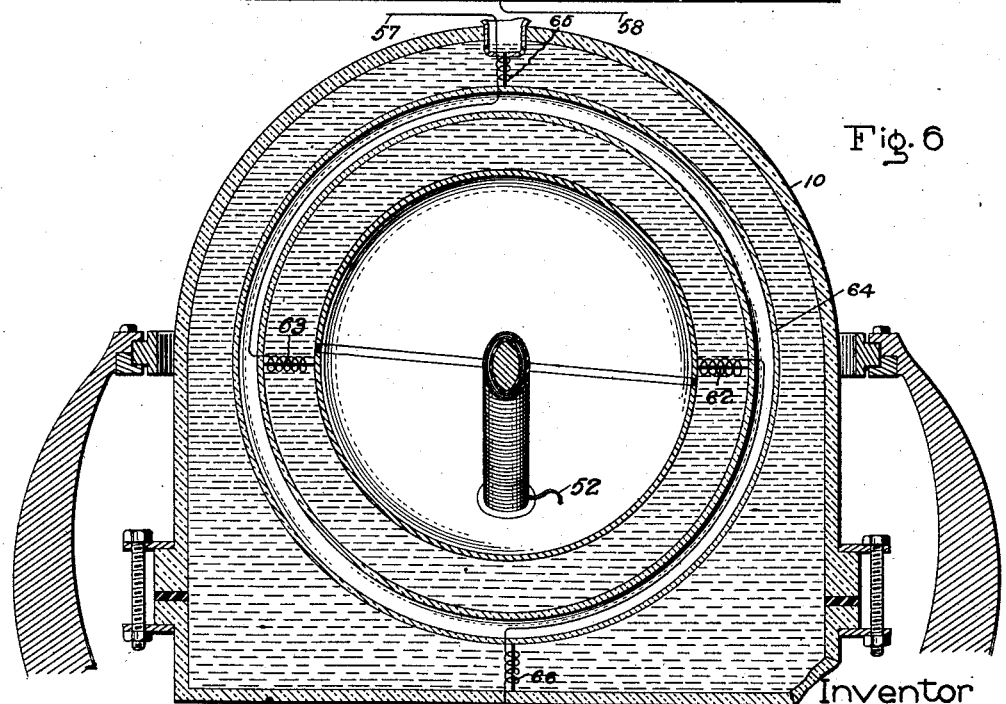

For a better understanding of my invention, reference should be had to the accompanying drawings, in which Fig. 1 is a view in perspective of a compass and dip indicator constructed in accordance with my invention; Fig. 2 is a vertical section of the apparatus shown in Fig. 1; Fig. 3 is a section of the compass needle; Fig. 4 is a diagrammatic view showing the electrical connections for the compass needle; Fig. 5 is an elevation view of a modification of my invention, while Fig. 6 is a vertical section of the apparatus shown in Fig. 5.

Referring to Figs. 1 and 2 of the drawings, in one form of my invention, the vessel 10, made of a suitable transparent and electrically non-conducting material, such as glass, is mounted in a gimbal ring 11 so as to be freely movable about intersecting axes at right angles to each other, one of which is the axis 12 about which the vessel is supported and the other the axis 13 of the gimbal ring. The gimbal ring is supported on posts 14 and 15 which are secured to a suitable base 15'. The vessel being provided with a heavy base, is maintained by gravity in a horizontal position irrespective of the angular position of its support, which may be a ship, airplane, or the like. The upper portion of the vessel 10 is spherical, while the lower portion is cylindrical and provided with a flange. The vessel is closed by a glass cover or base 16 having a corresponding flange, by means of bolts passing thru metallic rings 18 and 18' which engage the flanges on the vessel and cover, respectively. A packing ring 19 is provided between the cover and the vessel for the purpose of making a tight joint. The vessel is filled with a suitable liquid 20 having the desired buoyancy. The upper spherical end of the vessel is graduated in degrees by means of horizontal concentric circles 21, and one of the concentric circles has graduations 21' according to the points of the compass.

At the uppermost point of the vessel, centrally of the spherical portion, is secured a spherical glass casing 20$^a$, forming an expansion chamber and communicating with the vessel thru small apertures 20$^b$. This expansion chamber is provided to allow for expansion and contraction of the liquid 20 due to changes in temperature. While apertures 20$^b$ are large enough to take care of the relatively slow changes in volume due to variations in temperature, they do not permit sufficient freedom of the liquid to cause currents to be set up upon movement of the vessel.

Immersed in the liquid in the vessel 10 is an electromagnetic compass needle 22 carrying at one end a pointer 23. The compass needle and pointer are each constructed to have a density such that they are supported without excess or defect of buoyancy by the buoyant effect of the liquid in the vessel. The compass needle is therefore freely movable in the supporting liquid to take up a position in the direction of the earth's magnetic field. In order to relate the movements of the compass needle with the concentric circles 21, the compass needle is provided with jeweled defining bearings for causing its movements to take place about intersecting vertical and horizontal axes. Movement of the compass needle about a horizontal axis is defined by two jeweled bearings 24 and 25 (see Fig. 3) carried on opposite sides of the needle. The bearings are attached to a metallic band 26 which is secured firmly to the needle so that the axis of the bearings is at right angles with the needle and passes thru its center of gravity. Cooperating with the bearings 24 and 25 are pivot needles 27 and 28, respectively. The pivots 27 and 28 are carried in a frame 29, which is rectangular in shape and comprises two hollow forked members 32 and 33 constructed of glass and connected by metallic tubes 34 and 35. The metallic tubes 34 and 35 are provided with central supports 36 and 37 for the pivot needles 27 and 28. Movement of the compass needle about a vertical axis is defined by constraining the supporting frame 29 to move about a vertical axis. This is effected by means of a jeweled bearing 40 secured to the upper end of the frame and a metallic pivot needle 41 secured to its lower end. Cooperating with the bearing 40 is a metallic pivot needle 42 secured to casing 20ª centrally of the spherical portion of the vessel, while the pivot needle 41 cooperates with a jeweled bearing 43 secured to the center of cover 16. Pivot 42 and bearing 43 lie in the vertical center line of the containing vessel. The frame 29 is thus supported to move about a vertical axis which is coincident with the vertical diameter of the spherical top of vessel 10. A pointer 44, constructed preferably of hollow glass tubing, is attached to upper fork 32 at right angles to the compass needle 22. The pointer 44 is in position to cooperate with the scale 21'. The supporting framework 29, including the pointer 44 is constructed to have a density which is equal to the density of the containing liquid in the vessel 10 so that the frame work is supported entirely by the buoyant effect of the liquid. The bearings for the frame work are provided merely for the purpose of defining its movements; they do not support any of its weight.

The pivot needle 42 is provided with an enlarged base which is tightly sealed in the casing 20ª and extends thru the casing for connection with an electric circuit. Jeweled bearing 43 is mounted in a metallic cup member 43' which is filled with mercury to form a mercury cup whereby electrical contact is established with pivot needle 41. The cup member is tightly sealed in cover 16 and passes therethru for connection with an electric circuit. Jeweled bearing 40 is mounted in a metallic member 40' which forms a mercury cup above the bearing whereby electrical contact is established with pivot needle 42. Member 40' fits over the upward projecting arm of glass fork 32 and is cemented securely thereto. Pivot needle 41 is secured in a similar manner to fork 33.

Referring to Fig. 3, the compass needle 22 comprises an electromagnet 48 consisting of an electric conductor 49 wound on a length of core iron 50. The electromagnet is secured centrally in a cylindrical casing 51 made of a suitable insulating material, such as glass, to one end of which the hollow glass pointer 23 is secured, the pointer extending along the longitudinal axis of the electromagnet. Terminals 52 and 53 for the electromagnet are brought out thru the casing 51 adjacent the defining bearings 24 and 25, respectively. The exterior portions of the terminals are formed of very fine wire and bent in helical form, as shown in the drawing. The casing is tightly closed at each end by packing rings, and sealed around the terminals 52 and 53, to prevent the entrance of moisture.

By means of two pairs of suitable weighted clamping rings 54 and 55, placed adjacent its ends, the compass needle can be balanced about both its longitudinal axis and its horizontal axis defined by bearings 24 and 25. The rings may be independently moved along the length and about the longitudinal axis of the compass needle to effect this adjustment. By adjusting the rings of each pair relatively to each other about the longitudinal axis of the needle, their weights may be made to exactly counterbalance each other and at the same time counterbalance any unbalancing force about this axis. The needle can thus be balanced at each end about its longitudinal axis to stabilize it in the supporting liquid. Referring to Fig. 4, the electromagnet 48 is connected to a suitable source of direct current supply 56 by means of conductors 57 and 58. Conductor 57 extends thru a sealed outlet in casing 20ª and is electrically connected to needle 42. The circuit leads from this point thru the needle and mercury cup 40' to a conductor 59 which threads downward thru frame 29 to a point adjacent pivot needle 27 where the conductor is brought out thru a watertight outlet and connected to fine wire terminal 52 of the electromagnet. Conductor 58 is connected to mercury cup 43', the circuit leading as previously described in connection with conductor 57 thru frame 29 by way of conductor 59' and out adjacent needle 28 where connection is made with fine wire terminal 53.

As thus constructed it will be observed that the compass needle will take up a position along the line of the earth's magnetic field and indicate on the concentric circles 21 the magnetic dip in degrees at the particular place at which the instrument is located. With respect to its moment of inertia, the electromagnetic needle has a stronger reaction with the earth's field than the ordinary permanent magnet and hence is more sensitive than the latter. By means of suitable charts of magnetic dip or inclination the latitude can be determined from this indication. The needle 44 points in a direction which is at right angles to the compass bearing and therefore indicates on the scale 21' the points of the compass towards which the ship or airplane is directed, it being necessary only to displace the scale 21' thru a 90 degree angle to correspond with the pointer 44. The indication given by pointer 44 may now be compared with a similar indication given by a compass maintaining the true north and south, such as a gyroscopic compass, and the angle of declination determined. From suitable charts of declination the longitude of the location of the instrument can be determined.

In Figs. 5 and 6 I have shown a modification of my invention in which the compass needle is mounted in a metallic spherical container 60 with its longitudinal axis coincident with a diameter of the sphere. The sphere is constructed in two equal sections which are insulated from each other and secured together by insulated bolts 61. The compass needle is brazed, or otherwise secured, at one end to the lower half of the sphere. The pointer 23 is preferably secured to the outside of the upper half of the sphere and extends along the longitudinal axis of the compass needle. Movement of the sphere about a horizontal axis is defined by means of silk threads 62 and 63 attached to the sphere and extending along a diameter of the sphere which is perpendicular to the compass needle. The threads 62 and 63 have their other ends secured to a tubular ring 64 at points in a diameter of the ring. The ring 64 is caused to move about a vertical axis by means of silk threads 65 and 66 attached to the ring at points in a diameter of the ring at right angles to threads 62 and 63 and having their opposite ends secured to the top and bottom of the vessel at points in the vertical diameter of the spherical top of the vessel. By means of this arrangement movements of the compass needle are defined about vertical and horizontal axes. The sphere with its compass needle and pointer and the ring are constructed to have such a density that they are suspended in equilibrium by the buoyant effect of the liquid in the vessel. These parts are balanced so that if the defining threads were removed they would be in equilibrium in any position in the liquid. The defining threads offer practically zero resistance to movement of the various parts about the axes which they define.

The electromagnetic coil of the compass needle is energized from suitable conductors 57 and 58 which are connected to a source of direct current supply. Conductor 57 extends thru casing 20ª into the vessel 10 adjacent defining thread 65, winds around the thread and passes into the ring 64 at a point adjacent thread 65. From this point the conductor is threaded thru the ring and brought out adjacent thread 63 around which it is coiled and electrically connected to the lower half of sphere 60. Conductor 58 passes in a similar manner thru vessel 10 adjacent thread 66 and is wound around thread 66, passed thru ring 64 and brought out adjacent thread 62 around which it is coiled and connected to the upper half of sphere 60. Sealed outlets are provided for conductors 57 and 58 at the points where the conductors enter the vessel 10 and ring 64. The conductors are also insulated from the ring. One of the terminals 52 of the electromagnet is permanently connected to the lower half of the sphere and is in this manner therefore electrically connected thru the lower half of the sphere to conductor 57. The other terminal 53 of the electromagnet is connected to the upper half of the sphere by means of spring arm 67 so as to be electrically connected to conductor 58. The conductors 57 and 58 are made of very fine wire for the purpose of decreasing to practically zero their retardation effect on the moving parts to which they are connected.

The operation of this modification of my invention is substantially the same as previously described in connection with Figs. 1 to 4 inclusive, with the exception that in this modification the needle 23 indicates both the magnetic dip, as previously described, and also the compass bearing on suitable meridian lines 68 which are drawn on the upper spherical portion of the vessel 10. The spherical form of the suspended member is adapted to minimize errors due to currents set up by any cause in the liquid.

By means of my invention I have thus provided means for automatically indicating the dip and compass bearing to a high degree independent of the position and accelerations of the support for the instrument. I have so mounted a compass needle that it is movable to any angular position in space and is in equilibrium in all positions. The needle moves with practically zero friction and retardation and hence is extremely accurate and sensitive.

In accordance with the provisions of the patent statutes, I have described the principle of operation of my invention, together with the apparatus which I now consider to represent the best embodiment thereof, but I desire to have it understood that the apparatus shown is only illustrative and that the invention can be carried out by other means.

What I claim as new and desire to secure by Letters Patent of the United States, is:

1. A compass and magnetic dip indicator comprising a vessel, a liquid contained in said vessel, a magnetic needle supported in said liquid so as to be free to take up a position in the direction of the earth's magnetic field, and bearings for said needle for defining its movements about definite axes.

2. A compass and magnetic dip indicator comprising a vessel, a liquid contained in said vessel, a magnetic needle supported in said liquid so as to be free to take up a position in the direction of the earth's magnetic field, and bearings for said needle for defining its movements with relation to said vessel.

3. A compass and magnetic dip indicator comprising a vessel, a liquid contained in said vessel, a hollow element neutrally supported by the buoyancy of said liquid, an electromagnet mounted within said hollow element and movable therewith in said liquid, and means for energizing said electromagnet, said vessel being transparent whereby the orientation of said electromagnet may be observed.

4. A compass and magnetic dip indicator comprising a vessel, a liquid contained in said vessel, a sphere neutrally supported by the buoyancy of said liquid, an electromagnet mounted and movable therewith in said liquid, and within said sphere means for energizing said electromagnet, said vessel being transparent whereby the orientation of said electromagnet may be observed.

5. A compass and magnetic dip indicator comprising a transparent vessel having a spherical portion, a liquid contained in said vessel, a magnetic needle supported in said liquid so as to be free to take up a position in the direction of the earth's magnetic field, there being graduations on the spherical portion of said vessel, and bearings for said needle for defining its movements with relation to said graduations whereby the needle indicates thereon magnetic dip and the points of the compass.

6. A compass and magnetic dip indicator comprising a vessel means for maintaining said vessel in a horizontal position, a liquid contained in said vessel, a magnetic needle supported in said liquid so as to be free to take up a position in the direction of the earth's magnetic field, and defining bearings associated with said needle and said vessel for causing the movements of said needle to take place about intersecting horizontal and vertical axes.

7. A compass and magnetic dip indicator comprising a transparent vessel having a spherical portion, means for supporting said vessel so as to maintain a definite diameter of said spherical portion vertical, a liquid contained in said vessel, a magnetic needle supported in said liquid so as to be free to take up a position in the direction of the earth's magnetic field, means including defining bearings for causing the movements of said needle to take place about intersecting axes at right angles to each other, one of which is the vertical diameter of said spherical portion, there being graduations on said spherical portion on which the needle indicates magnetic dip and the points of the compass.

8. A compass and magnetic dip indicator comprising a transparent vessel, there being graduations on said vessel, a gimbal for supporting said vessel, a liquid contained in said vessel, a magnetic needle neutrally supported by said liquid so as to be free to take up a position in the direction of the earth's magnetic field, a frame neutrally supported by said liquid, horizontal defining bearings on said frame for said needle, and vertical defining bearings on said vessel for said frame, whereby movements of said needle are defined about intersecting vertical and horizontal axes with relation to said graduations so that the needle indicates thereon the magnetic dip and points of the compass.

9. A compass and magnetic dip indicator comprising a transparent vessel, there being graduations on said vessel, a liquid contained in said vessel, a hollow sphere supported in said liquid, a magnetic needle secured in said sphere and having a pointer extending without the sphere, said sphere and needle being neutrally supported by said liquid so that the needle is free to take up a position in the direction of the earth's magnetic field, and means for defining the movements of said needle with relation to said graduations so as to cause the pointer to indicate thereon the magnetic dip and points of the compass.

10. A compass and magnetic dip indicator comprising a transparent vessel, there being graduations on said vessel, a liquid contained in said vessel, a hollow metallic sphere in said liquid consisting of two sections electrically insulated from each other, an electromagnetic needle supported in said sphere and provided with an electromagnet having its terminals connected respectively to the sections of said sphere, a source of electric supply for said electromagnet connected to the sections of said sphere, a pointer for said needle extending without the sphere, said sphere and needle being neutrally supported by said liquid so that the needle is free to take up a position in the direction of the earth's magnetic field, and defining means for said sphere whereby movements of said needle are related to said graduations so as to cause the pointer to indicate thereon the magnetic dip and points of the compass.

11. A compass and magnetic dip indicator comprising a transparent vessel, there being graduations on said vessel, a gimbal for supporting said vessel, a liquid contained in said vessel, a hollow metallic sphere in said liquid, a magnetic needle secured in said sphere, and having a pointer extending without the sphere, said sphere and magnetic needle being neutrally supported by said liquid so that the needle is free to take up a position in the direction of the earth's magnetic field, a frame supported in equilibrium in said liquid, horizontal defining means connecting said frame and said sphere, and vertical defining means connecting said vessel and said frame, whereby movements of said needle are defined about intersecting vertical and horizontal axes with relation to said graduations so that the pointer indicates thereon the magnetic dip and points of the compass.

In witness whereof, I have hereunto set my hand this twenty-second day of October, 1921.

CHARLES G. ABBOT.